United States Patent Office 3,641,179
Patented Feb. 8, 1972

3,641,179
TRIMERIC HYDROCARBON
Charles Ferdinand Huebner, Chatham, N.J., assignor to Ciba Corporation, Summit, N.J.
No Drawing. Filed Nov. 7, 1969, Ser. No. 874,959
Int. Cl. C07c 15/20, 15/28
U.S. Cl. 260—668 F
3 Claims

ABSTRACT OF THE DISCLOSURE

Trimesanthracenobenzenes, e.g. those of the formula

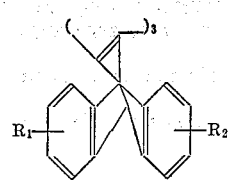

$R_{1,2}$=H or alkyl
are high melting and thermally stable compounds.

SUMMARY OF THE INVENTION

The present invention concerns and has for its object the provision of new trimesanthacenobenzenes (5,6,11,-12,17,18 - hexahydro - 5,18:6,11:12,17-tri-o-benzeno-trinaphthylenes), more particularly of those having the Formula I

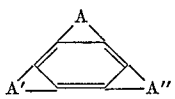

in which each of A, A' and A" is a 9,10-dihydro-9,10-anthrylene radical, as well as of methods for the preparation and application of said products. They are extremely high melting and thermally stable organic compounds useful as light, non-conductive hydraulic components of electric or thermal systems.

DESCRIPTION OF THE PREFERRED EMBODIMENT

The 9,10-dihydro-9,10-anthrylene radicals A, A' and A" are unsubstituted or substituted in the aromatic nuclei by one or more than one, preferably by one or two, of the same or different substituents selected from lower alkyl, e.g. methyl, ethyl, n- or i-propyl or butyl groups. The term "lower," referred to above and hereinafter in connection with organic radicals or compounds respectively, defines such with up to 7, preferably up to 4 carbon atoms.

The compounds of the invention exhibit valuable physical properties. Primarily they are extremely high melting compounds having the low density in common with most of the remaining organic compounds. For example, the unsubstituted parent compound of the empirical formula $C_{48}H_{30}$ melts in a sealed tube at about 580° C. and can be repeatedly remelted after cooling without any noticeable darkening of the colorless crystals. Accordingly, the compounds of the invention are valuable thermally resistant compounds useful for example, as the operating liquid in a heat pipe, i.e. the versatile heat-transfer device consisting of a tube, a wick and a liquid circulating between both ends kept at different temperatures, or as a light, inert hydraulic liquid in devices operating at high temperatures, such as gas turbines or rocket engines.

Preferred compounds of Formula I are those, in which A, A' and A" are identical and represent the 9,10-dihydro-9,10-anthrylene radical of the Formula II

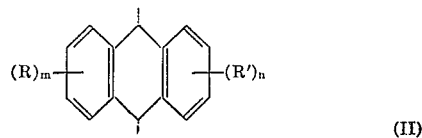

in which each of R and R' is above all hydrogen, or lower alkyl, and each of m and n is the integer 1 or 2.

Especially valuable are compounds of Formula I, in which each of A, A' and A" are identical and are represented by Formula II, in which each of R and R' is hydrogen, or methyl, and each of m and n is the integer 1 or 2.

The compounds of the invention are prepared by metallating a reactively esterified 11-hydroxy-9,10-dihydro-9,10-ethenoanthracene in the 12-position and coupling the resulting organometallic product according to the Wurtz or Wurtz-Fittig reaction and, if desired, converting any resulting compound into another compound of the invention.

The reactive ester used as starting material is advantageously such of a mineral or sulfonic acid, preferably that of a hydrohalic, e.g. hydrochloric acid. The metallation can be performed with the use of reactive aliphatic or aromatic metal compounds, advantageously lower alkyl or phenyl alkali metal compounds, such as n-butyl lithium or phenyl sodium. The resulting metal compound is coupled in the usual manner, e.g. by the action of heat.

The above reactions are carried out according to standard methods, in the presence or absence of diluents, preferably such as are inert to the reagents and are solvents thereof, of catalysts, e.g. alkali metal amides in the coupling reaction, condensing or neutralizing agents and/or inert atmospheres, at low temperatures, room temperature or elevated temperatures, at atmospheric or super-atmospheric pressure.

The invention also comprises any modification of the above process, wherein a compound resulting as an intermediate at any stage thereof, is used as starting material, and the remaining steps are carried out, or the process is discontinued at any stage thereof, or in which the starting material is formed under the reaction conditions or is used in the form of its salts or reactive derivatives.

The starting material used is known or, if new, may be prepared according to the methods described for known analogs thereof, e.g. in J. Am. Chem. Soc. 74, 2193 (1952).

The following example is intended to illustrate the invention and is not to be construed as being a limitation thereon. Temperatures are given in degrees centigrade, and all parts wherever given are parts by weight.

EXAMPLE 1

To the solution of 5 g. 11-chloro-9,10-dihydro-9,10-ethenoanthracene in 50 ml. tetrahydrofuran, 12.5 ml. of a 1.6 molar solution of n-butyl lithium in hexane are added during 10 minutes while stirring under nitrogen and keeping the temperature at 5°. After 30 minutes, the mixture is allowed to warm up to room temperature, and two hours later 5 g. powdered Dry Ice ($CO_2$) are added in order to destroy any excess organic lithium compounds. The mixture is evaporated in vacuo, the residue is taken up in 100 ml. diethyl ether, the mixture extracted with N aqueous sodium hydroxide and the insoluble material separating from the ethereal phase filtered off. It is recrystallized from a large volume of acetic acid or a smaller volume of dimethylsulfoxide, to yield the trimesanthracenobenzene of the formula

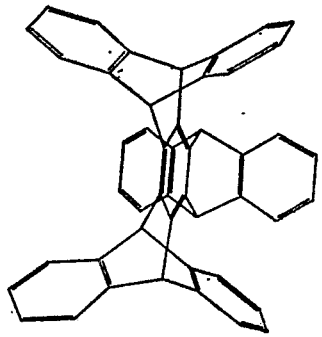

melting in a sealed tube at about 580°.

What is claimed is:
1. The trimesanthracenobenzenes of the formula

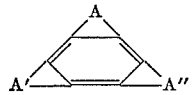

in which each of A, A' and A" is an unsubstituted 9,10-dihydro-9,10-anthrylene radical or such radical substituted by one or two lower alkyl groups.

2. A compound as claimed in claim 1, in which formula the A, A' and A" moieties are identical and represent the 9,10-dihydro-9,10-anthrylene radical of the formula

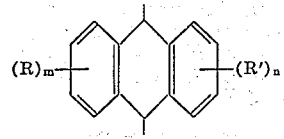

in which each of R and R' is hydrogen or, methyl, and each of $m$ and $n$ is the integer 1 or 2.

3. A compound as claimed in claim 1 and being the trimesanthracenobenzene having the empirical formula $C_{48}H_{30}$ and containing 7 benzene nuclei per molecule.

No references cited.

CURTIS R. DAVIS, Primary Examiner

PO-1050
(5/69)

UNITED STATES PATENT OFFICE CASE SU-?
CERTIFICATE OF CORRECTION

Patent No. 3,641,179           Dated February 8, 1972

Inventor(s) CHARLES FERDINAND HUEBNER

It is certified that error appears in the above-identified patent and that said Letters Patent are hereby corrected as shown below:

Column 1, line 4, should read --- CIBA-GEIGY Corporation, a corporation of New York, --.

Signed and sealed this 17th day of September 1974.

(SEAL)
Attest:

McCOY M. GIBSON, JR.          C. MARSHALL DANN
Attesting Officer             Commissioner of Patents